United States Patent [19]

Jolliff

[11] Patent Number: 5,183,138
[45] Date of Patent: Feb. 2, 1993

[54] TRANSMISSION PARKING BRAKE
[75] Inventor: Norman E. Jolliff, Onsted, Mich.
[73] Assignee: Tecumseh Products Company, Tecumseh, Mich.
[21] Appl. No.: 824,379
[22] Filed: Jan. 23, 1992
[51] Int. Cl.⁵ .............................. B60K 41/26
[52] U.S. Cl. ................... 192/4 C; 74/371; 192/4 A
[58] Field of Search ............. 192/4 C, 4 R, 4 A; 74/371, 411.5, 606 R; 475/900; 188/31

[56] References Cited

U.S. PATENT DOCUMENTS

| | | | |
|---|---|---|---|
| 1,857,253 | 5/1932 | Miller et al. | 192/4 A |
| 1,864,142 | 6/1932 | Meyer | 192/4 A |
| 2,049,798 | 8/1936 | Booth et al. | 192/4 A X |
| 2,815,104 | 12/1957 | Du Shane | 188/265 |
| 4,713,983 | 12/1987 | Rundle | 74/371 |
| 4,809,560 | 3/1989 | Nemoto | 74/371 |
| 4,827,783 | 5/1989 | Yamaoka et al. | 74/371 |
| 4,932,278 | 6/1990 | Nemoto | 74/371 |
| 4,966,574 | 10/1990 | von Kaler et al. | 74/371 X |
| 5,000,056 | 3/1991 | Crawford et al. | 74/371 |

FOREIGN PATENT DOCUMENTS 3825286  9/1989  Fed. Rep. of Germany ..... 192/4 A

Primary Examiner—Rodney H. Bonck
Attorney, Agent, or Firm—Baker & Daniels

[57] ABSTRACT

The present invention is a parking brake for a transmission or transaxle. The parking brake includes a parking block made of a material stronger than the housing and having keyways for engaging and locking the shift keys of the transmission. The parking block is located in recesses in the housing halves and is thereby prevented from rotating. By engaging the non-rotatable parking block, the shift keys are prevented from rotating and thereby prevent the rotation of the shift shaft and transmission of that motion to the axles.

20 Claims, 2 Drawing Sheets

TRANSMISSION PARKING BRAKE

BACKGROUND OF THE INVENTION

1. Field of the Invention

The present invention relates to in-line shift transmissions for small tractors, riding mowers, and the like. More specifically, the field of the invention is that of parking brakes for in-line transmissions.

2. Prior Art

In-line shift transmissions include a plurality of linked transmission shafts, with one of the shafts being a shift shaft supporting a plurality of rotatable spur gears. Disposed axially within the shift shaft are keys which can engage internal keyways of the spur gears and thereby rotatably connect the engaged gear to the output shaft. The key including an elongate shaft and a head portion at one end which is biased by the shaft to extend into the gear keyway, the shaft of the key comprising a resilient metal material.

An in-line transmission is disclosed in U.S. Pat. No. 4,966,574, assigned to assignee of the present invention, the disclosure of which is explicitly incorporated by reference. The housing is made of a lighter metal, such as aluminum, and rotatably supports the transmission shafts. The shifting mechanism of the '574 transmission includes a pair of axially movable shift keys disposed in longitudinal channels of the shift shaft. The shift keys rotatably couple the shift shaft with one of the spur gears. Each key has a base portion engaging a shift collar which is axially slidable on the shift shaft. The collar has a peripheral groove receiving a pin of a shift fork. The shift fork can pivot within the housing and is connected to the shifting mechanism of the vehicle.

The shift fork, pin, and annular groove permit the collar, and hence the keys, to be moved axially while the keys are at the same time rotating with the shift shaft. Each of the spur gears journalled on the shift shaft has on its inner circumference four circumferentially spaced keyways which may be engaged by the keys to rotatably couple the shift shaft with the selected spur gear. The keys have triangular key heads and flexible spring shank portions which spring bias the key heads radially outward and into the keyways.

The vehicles which include in-line shift transmissions may also include a parking brake for locking the position of the vehicle, which is in addition to the braking system used to decelerate the vehicle. Further, many such vehicles also include an additional implement that may be used when the vehicle is stationary, e.g., a chopper or shredder. The motor of the vehicle is used to drive the additional implement, causing vibration and movement which makes having a parking brake more important. However, to provide a parking brake in such a transmission, a separate parking brake mechanism is required, for example a brake disc, a pair of parking brake pads, and a mechanism for clamping the brake pads on the brake disc. Providing a separate parking brake mechanism and associated linkage requires additional materials and further assembly which increases the cost of manufacturing the transmission, and also increases the amount of linkage with the transmission which may require additional maintenance.

As an alternative to a separate parking brake mechanism, a parking brake keyway may be cast into the transmission housing so that the shift shaft cannot rotate when a key is engaged with the parking brake keyway, thus stopping the output of the transmission. However, to withstand the rotational force of the shift shaft, the housing must be made of a stronger, more durable material, such as a heavier metal like iron or steel. This requires that the transmission housing be made of a more expensive material because such durable materials generally cost significantly more than lighter metals. Further, the increased weight of the housing due to the heavier metal of the housing adding to the load on the vehicle thus impairing performance.

What is needed is a more economical transmission parking brake for small tractors, riding mowers, and the like.

Also needed is a parking brake arrangement for transmissions of vehicles having additional implements.

SUMMARY OF THE INVENTION

The present invention is a transmission having a parking brake. The brake mechanism includes a parking block made of relatively strong, durable material which is located in the housing of the transmission, the housing being made of a relatively weaker, lighter, and less expensive material. The parking block is rotationally fixed in relation to the housing and includes a generally cylindrical opening and keyways which the shift key may engage. When the shift key engages the keyway of the parking block, the shift shaft is prevented from rotating and transmitting further motion to the output shaft, thus braking the transmission.

In one embodiment, the parking block includes an outer keying portion which has an angular periphery and fits within recesses of the housing shaped to accept the keying portion. An engaging portion is disposed around the shift shaft and defines a keyway for receiving the shift key.

The present invention, in one form, is a transmission or transaxle comprising a housing, a plurality of shafts, a key, a shifting mechanism, and a parking block. The shafts are rotatably disposed within the housing, and one of the shafts is a shift shaft having a plurality of gears. The shift shaft also includes an axial channel and each of the gears also includes a keyway. The key is disposed within the axial channel of the shift shaft, and is arranged to selectively engage one of the gear keyways. The shifting mechanism is adapted to move the key within the axial channel of the shift shaft and selectively engages the key with one of the gear keyways. The parking block is made of a material having greater strength than the material of the housing whereby the key may fixedly engage the parking block and prevent rotation of the shift shaft.

One object of the present invention is to provide a more economical transmission parking brake for small tractors, self-propelled shredder/baggers, riding mowers, and the like.

Another object is to provide a parking brake arrangement for transmissions of vehicles having additional implements.

BRIEF DESCRIPTION OF THE DRAWINGS

The above mentioned and other features and objects of this invention, and the manner of attaining them, will become more apparent and the invention itself will be better understood by reference to the following description of a embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplifications are not to be construed as limiting the scope of the invention in any manner.

DESCRIPTION OF THE PREFERRED EMBODIMENT

Figure 1:
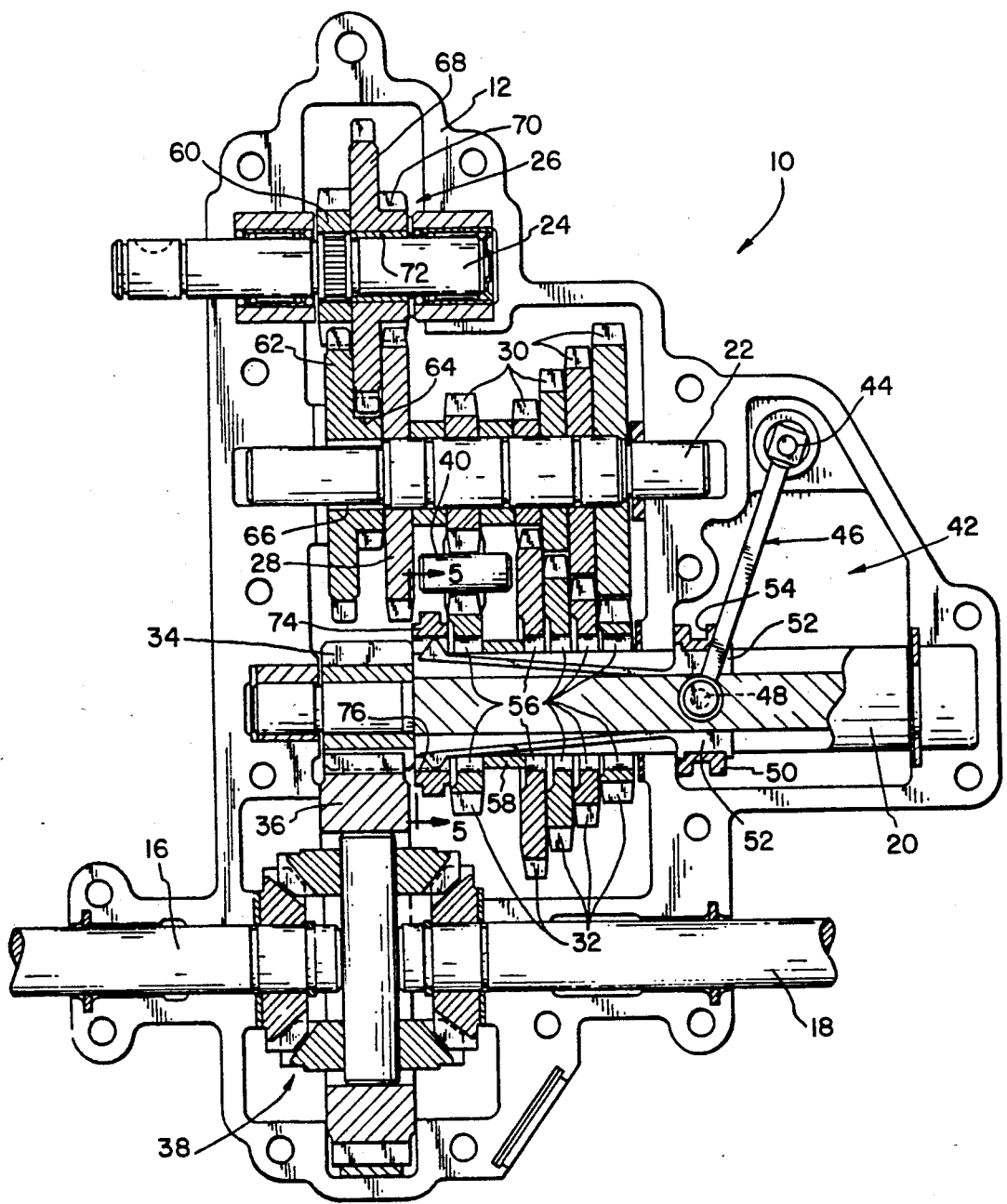
FIG. 1 is a top view, in partial cut-away, of a transmission with a parking brake of the present invention.
Figure 5:
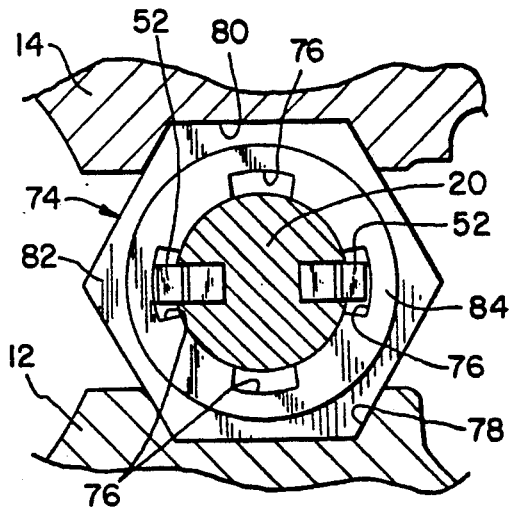
FIG. 5 is a view taken along view line 5—5 of FIG. 1.

The present invention relates to in-line shift transaxle 10 as shown in FIG. 1. Lower housing 12 together with upper housing 14 (shown in FIG. 5) rotatably supports axles 16 and 18, shift shaft 20, counter shaft 22, and drive shaft 24. Drive shaft 24 turns cluster gear arrangement 26 which turns drive gear 28 and thereby rotatably connects drive shaft 24 and counter shaft 22. Companion gears 30 of counter shaft 20 engage spur gears 32 of shift shaft 20 so that gear 34 of shift shaft 20 drives ring gear 36 of differential 38 and thereby turns axles 16 and 18 in a forward direction. In addition, a reverse gear may be provided by stub shaft and gear 40 being disposed between one of companion gears 30 and one of spur gears 32.

The transmission gear ratio of transaxle 10 is determined by shifting mechanism 42 which includes shift input shaft 44, shift fork 46, pin 48, collar 50, and shift keys 52. Shift input shaft 44 is connected in a known manner to linkage (not shown) of the vehicle which allows the vehicle operator to change gears manually. Shift fork 46 is pivotally connected with shift input shaft 44 and includes pin 48 which extends into annular groove 54 of collar 50, which is located on shift shaft 20 and operably engages keys 52. Keys 52 are disposed within shift shaft 20 and selectively engage gear keyways 56 which are internal recesses in spur gears 32. Neutral sleeve 58 provides an axial position within shift shaft 20 wherein keys 52 do not engage any keyway 56. Alternatively, neutral sleeve 58 may include an internal recess to provide an engagable neutral position.

Cluster gear arrangement 26 transmits motion from drive shaft 24 to counter shaft 22 with high reduction. Cluster gear arrangement 26 includes input gear 60 which is splined to drive shaft 24. Reduction gear 62 outwardly engages input gear 60, and includes a reduced diameter transition gear 64. Bushing 66 freely rotatably supports reduction gear 62 on counter shaft 22. Transition gear 64 also engages reduction gear 68 which includes a reduced diameter transition gear 70. Bushing 72 freely rotatably supports transition gear 70 on drive shaft 24. Transition gear 70 also engages drive gear 28 which thereby turns counter shaft 22. Input gear 60 and transition gears 64 and 70 have a relatively small diameter in relation to the external diameters of reduction gears 62 and 68 and drive gear 28 so that a significant reduction of input speed occurs as cluster gear arrangement transmits motion from input shaft 2 to counter shaft 22.

In accordance with the present invention, parking brake block 74 is disposed within transaxle 10 to provide an engagable parking brake position. Block 74 is made from material significantly stronger and more durable than the material comprising lower and upper housings 12 and 14. Block 74 is disposed around shift shaft 20 at an axial position at an end of gears 32 between gear 34 and the reverse gear of spur gears 32. Parking block keyways 76 are located in block 74 and are shaped to receive the head of key 52. Block 74 is keyed to the transmission by recess 78 of lower housing 12 and recess 80 of upper housing 14, see FIG. 5. Thus, when keys 52 engage parking block keyways 76, block 74 cannot rotate due to the non-rotatable connection with housings 12 and 14 so that shift shaft 20 is also prevented from rotating and therefore ceases to provide a driving force to differential 38.

Figure 2:
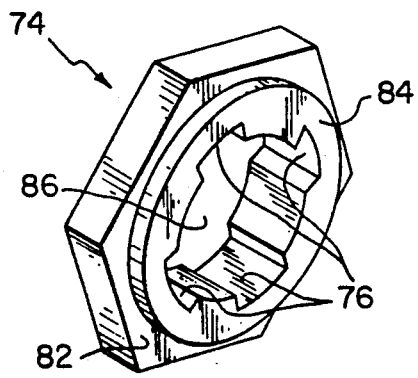
FIG. 2 is a perspective view of the parking block.
Figure 3:
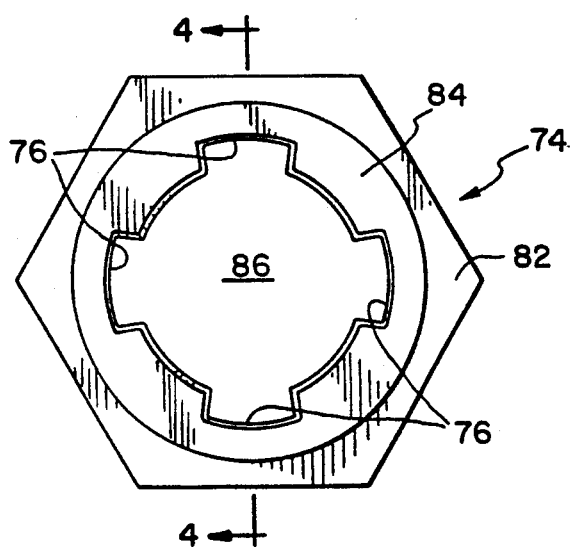
FIG. 3 is a front view of the parking block.
Figure 4:
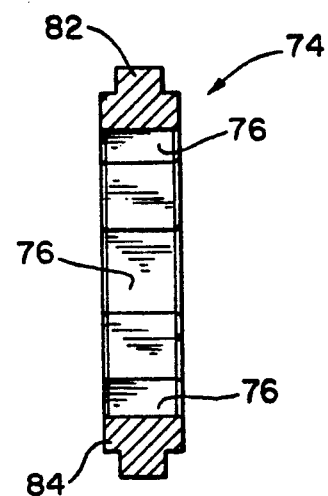
FIG. 4 is a view taken along view line 4—4 of FIG. 3.

The specific structure of the preferred embodiment of the present invention is shown in FIGS. 2-4. Block 74 includes keying portion 82 which is generally hexagonally shaped, with corners of the hexagon abutting and interfitting with recesses 78 and 80 of lower and upper housing 12 and 14, respectively, in order to prevent the rotation of block 74 within transaxle 10. Engaging portion 84 is generally cylindrical, extending on both sides of keying portion 82, and defines parking block keyways 76 and through aperture 86 which receives shift shaft 20. Block 74 is made of material having tensile strength in the range of 80,000 to 180,000 lbs./in$^2$, more particularly in the range of 140,000 to 145,000 lbs./in$^2$, and preferably of 145,000 lbs./in$^2$. Block 74 is preferably made of powdered metal, for example powdered metal (FN-0405-140 HT), although steel or any material capable of withstanding the high torques imparted by shift shaft 24 may be used. Upper and lower housings 12 and 14, which trap block 74, are preferably made of type 380 or 384 aluminum, generally having tensile strength in the range of 40,000 to 48,000 lbs./in$^2$.

Transaxle 10 is particularly well suited to be used in a vehicle having an implement capable of operation when the vehicle is stationary. For example, a self-propelled vehicle may include a shredder/bagger unit for processing debris such as grass and leaves. The shredder/bagger unit may be used for shredding and bagging debris and storing the processed debris in bags for disposal. Transaxle !0 may be advantageously used with a shredder/bagger unit because if used in a stationary position then parking block 74 allows transaxle 10 to lock up and prevent any rotation of axles 16 and 18 while the motor may continue to drive the shredder/bagger unit. No additional braking mechanism is required, and only an additional shift position is required for the linkage and operator lever (not shown) to provide the parking brake feature. Further, the brake is more reliable because parking block 74 physically blocks the rotation of axles 16 and 18 rather than a disc parking brake system or other arrangement which may deteriorate substantially over time.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:
1. A transmission comprising:
 a housing consisting essentially of a first material;
 a plurality of shafts rotatably disposed within said housing, one of said shafts being a shift shaft with a plurality of gears thereon, said shift shaft including an axial channel and each of said gears having a keyway;

a key disposed within said axial channel of said shift shaft, said key including means for engaging one of said gear keyways;

shifting means for moving said key within said shift shaft and selectively engaging said key with one of said keyways; and a parking block consisting essentially of a second material having greater strength than said first material, said parking block including means for engaging said key whereby said key is locked to said parking block to thereby prevent rotation of said shift shaft.

2. The transmission of claim 1 wherein said housing includes a recess shaped to receive said parking block and non-rotatably position said parking block in said housing.

3. The transmission of claim 2 wherein said parking block includes a keying portion interfitting with said recess.

4. The transmission of claim 3 wherein said keying portion has a generally hexagonal shape.

5. The transmission of claim 1 wherein said parking block includes a portion defining a parking keyway aligned with said axial channel of said shift shaft.

6. The transmission of claim 5 wherein said keyway defining portion receives said shift shaft.

7. The transmission of claim 1 wherein said parking block includes a portion defining four circumferentially spaced internal recesses forming four parking keyways in said parking block.

8. The transmission of claim 1 wherein said plurality of gears includes a plurality of forward gears and a reverse gear, and said parking block is located adjacent to said reverse gear.

9. The transmission of claim 1 wherein said parking block is located at an end of said plurality of gears on said shift shaft.

10. The transmission of claim 1 further comprising reduction gearing wherein said plurality of shafts includes an input shaft, said reduction gearing operably connecting said input shaft to said shift shaft.

11. The transmission of claim 1 wherein said first material consists essentially of aluminum.

12. The transmission of claim 1 wherein said second material has a tensile strength in the range of about 80,000 to 180,000 lbs./in$^2$.

13. The transmission of claim 1 wherein said second material has a tensile strength in the range of about 140,000 to 145,000 lbs./in$^2$.

14. The transmission of claim 1 wherein said second material has a tensile strength of about 145,000 lbs./in$^2$.

15. The transmission of claim 1 wherein said second material consists essentially of powdered metal.

16. A transaxle comprising:

an axle;

a housing consisting essentially of a first material, said housing rotatably supporting said axle;

an input shaft extending into said housing, said input shaft adapted to receive rotational motion;

transmission means for communicating rotational motion from said input shaft to said axle, said transmission means including a shift shaft with a plurality of gears thereon, said shift shaft including an axial channel and each of said gears having a keyway;

a key disposed within said axial channel of said shift shaft, said key including means for engaging one of said gear keyways;

shifting means for moving said key within said shift shaft and selectively engaging said key with one of said keyways; and parking brake means for locking said key and preventing rotation of said shift shaft, said parking brake means comprising a second material having greater strength than said first material.

17. The transaxle of claim 16 further comprising reduction gearing operably connecting said input shaft to said transmission means.

18. The transaxle of claim 16 wherein said parking brake means is located at an end of said plurality of gears on said shift shaft.

19. The transaxle of claim 16 wherein said housing includes a recess shaped to receive said parking brake means and non-rotatably position said parking brake means in said housing.

20. The transaxle of claim 16 wherein said plurality of gears includes a plurality of forward gears and a reverse gear, and said parking brake means is located adjacent to said reverse gear.

* * * * *